(12) United States Patent
Rice

(10) Patent No.: US 7,878,437 B2
(45) Date of Patent: Feb. 1, 2011

(54) CANISTER WITH ADJUSTABLE GRINDER

(75) Inventor: Chad E. Rice, Litiz, PA (US)

(73) Assignee: Berry Plastics Corporation, Evansville, IN (US)

( * ) Notice: Subject to any disclaimer, the term of this patent is extended or adjusted under 35 U.S.C. 154(b) by 39 days.

(21) Appl. No.: 12/256,305

(22) Filed: Oct. 22, 2008

(65) Prior Publication Data
US 2009/0134256 A1    May 28, 2009

Related U.S. Application Data

(60) Provisional application No. 60/981,551, filed on Oct. 22, 2007.

(51) Int. Cl.
*A47J 42/06* (2006.01)
(52) U.S. Cl. .................................. 241/189.1
(58) Field of Classification Search ................. 241/168, 241/169.1
See application file for complete search history.

(56) References Cited

U.S. PATENT DOCUMENTS

| | | | |
|---|---|---|---|
| 2,184,719 A | 12/1939 | Mantelet | |
| 3,136,491 A | 6/1964 | Posmanter | |
| 3,371,874 A | 3/1968 | Reeves et al. | |
| 3,991,947 A | 11/1976 | Schlessel | |
| 4,026,490 A | 5/1977 | Johansson | |
| 4,960,246 A | 10/1990 | Fohrman | |
| 5,176,329 A | 1/1993 | De Coster et al. | |
| 6,164,574 A * | 12/2000 | Weibel | 241/168 |
| 6,196,481 B1 | 3/2001 | Barbagli | |
| 6,224,005 B1 | 5/2001 | Wu | |
| 6,247,661 B1 | 6/2001 | Chainani | |
| 6,443,377 B1 | 9/2002 | Cheng | |
| 6,550,706 B2 * | 4/2003 | Lee et al. | 241/169.1 |
| 6,616,075 B1 | 9/2003 | Millerd | |
| 6,655,616 B1 | 12/2003 | Wagner | |
| 6,663,031 B2 | 12/2003 | Henderson et al. | |
| 6,830,206 B2 * | 12/2004 | Yang | 241/169.1 |
| 6,929,201 B1 | 8/2005 | Blouse et al. | |
| 6,948,672 B2 * | 9/2005 | Herren | 241/169.1 |
| 6,951,314 B2 | 10/2005 | Tang | |
| 7,048,216 B2 | 5/2006 | Ng | |
| 7,543,771 B2 * | 6/2009 | Wang Wu | 241/169.1 |
| 7,694,906 B2 * | 4/2010 | Fornage | 241/168 |
| 2002/0117566 A1 * | 8/2002 | Cheng | 241/169.1 |
| 2005/0029376 A1 * | 2/2005 | Heng et al. | 241/169.1 |
| 2005/0211806 A1 * | 9/2005 | Ng | 241/169.1 |
| 2006/0278746 A1 | 12/2006 | Delbridge et al. | |
| 2007/0210195 A1 * | 9/2007 | Chapman et al. | 241/169.1 |
| 2008/0315021 A1 * | 12/2008 | Tang | 241/169.1 |
| 2008/0315022 A1 * | 12/2008 | Wilson et al. | 241/169.1 |
| 2009/0236453 A1 * | 9/2009 | Heng et al. | 241/168 |

* cited by examiner

*Primary Examiner*—Faye Francis
(74) *Attorney, Agent, or Firm*—Barnes & Thornburg LLP

(57) ABSTRACT

A canister configured to include a container and a spice grinder coupled to the container. The spice grinder includes a grinding ring and a feed cone unit that cooperates with the grinding ring to define a grinding chamber therebetween.

27 Claims, 6 Drawing Sheets

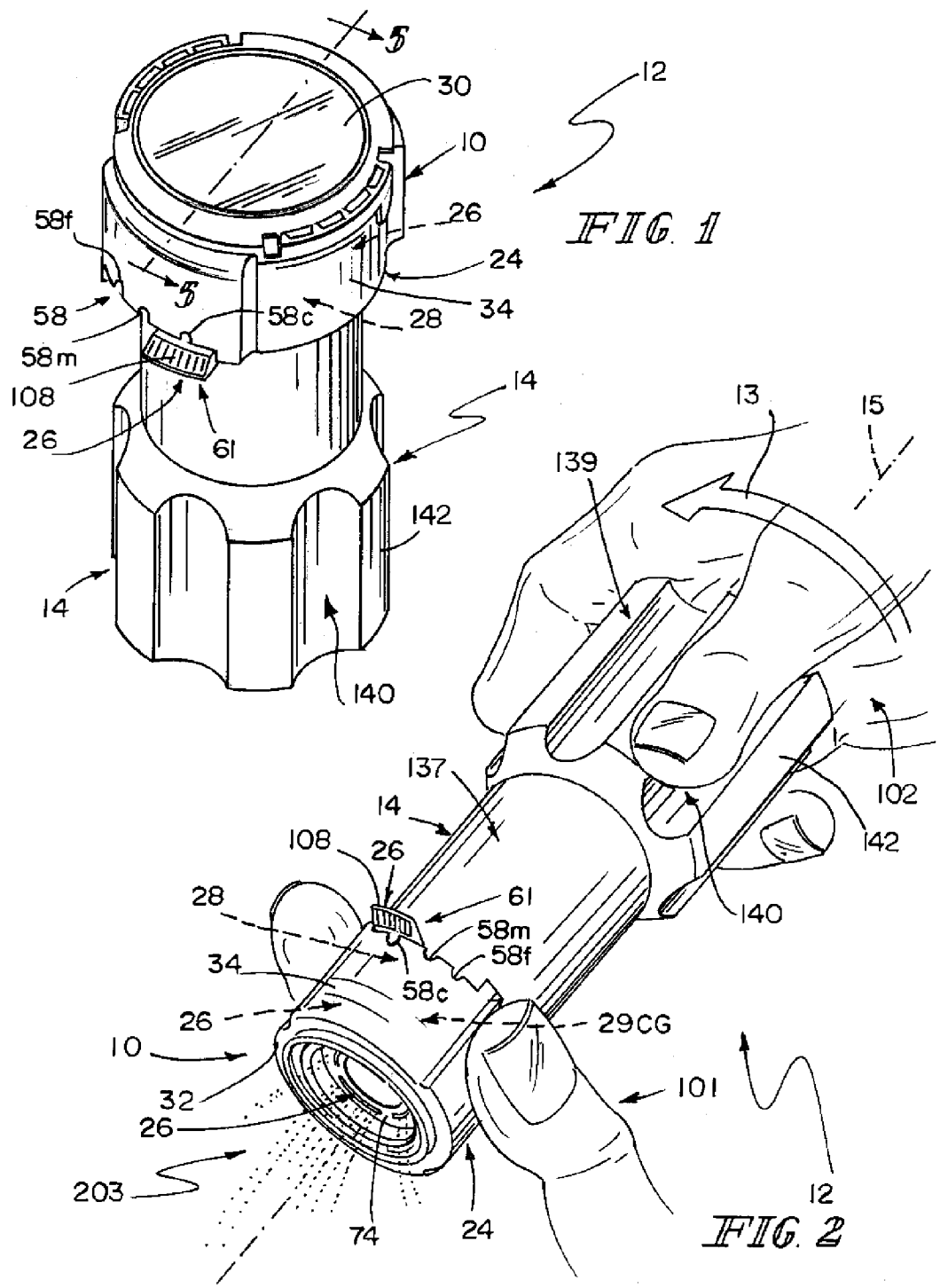

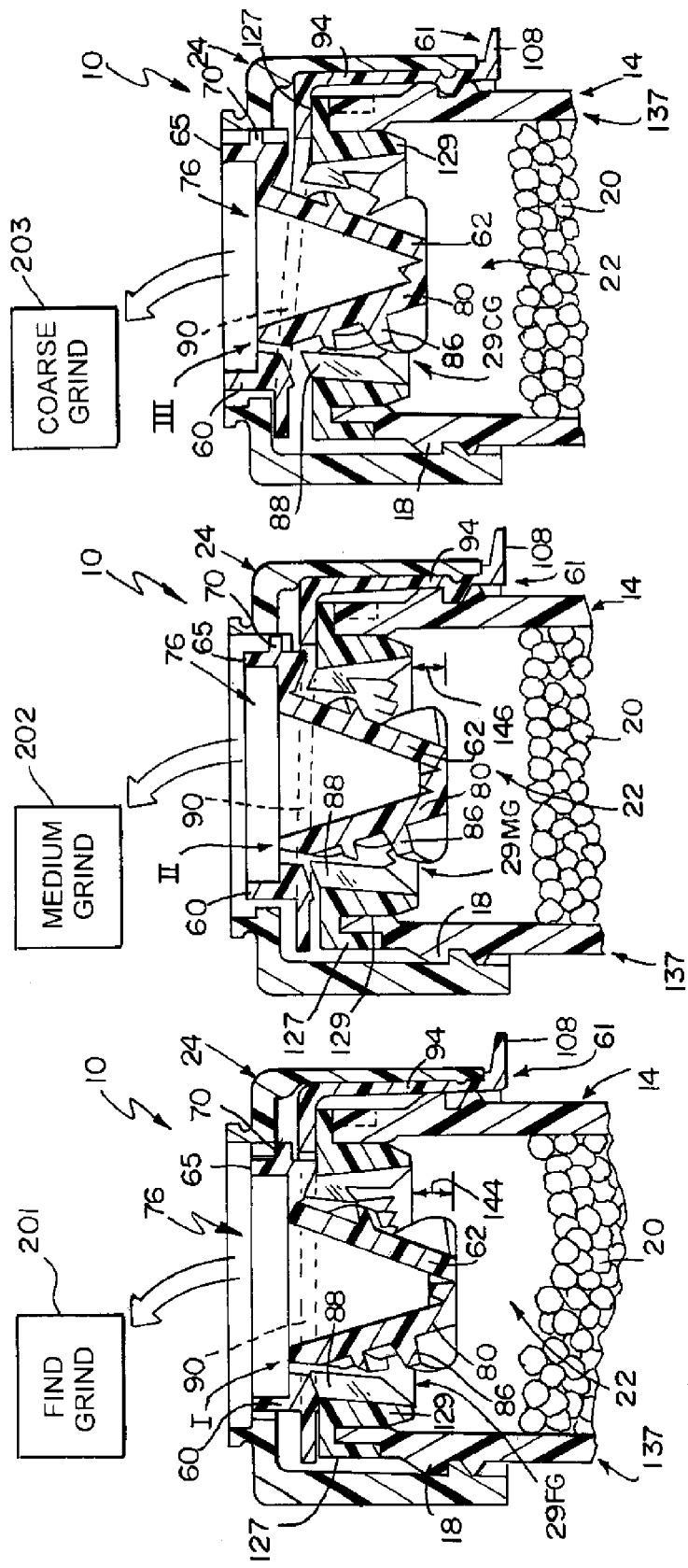

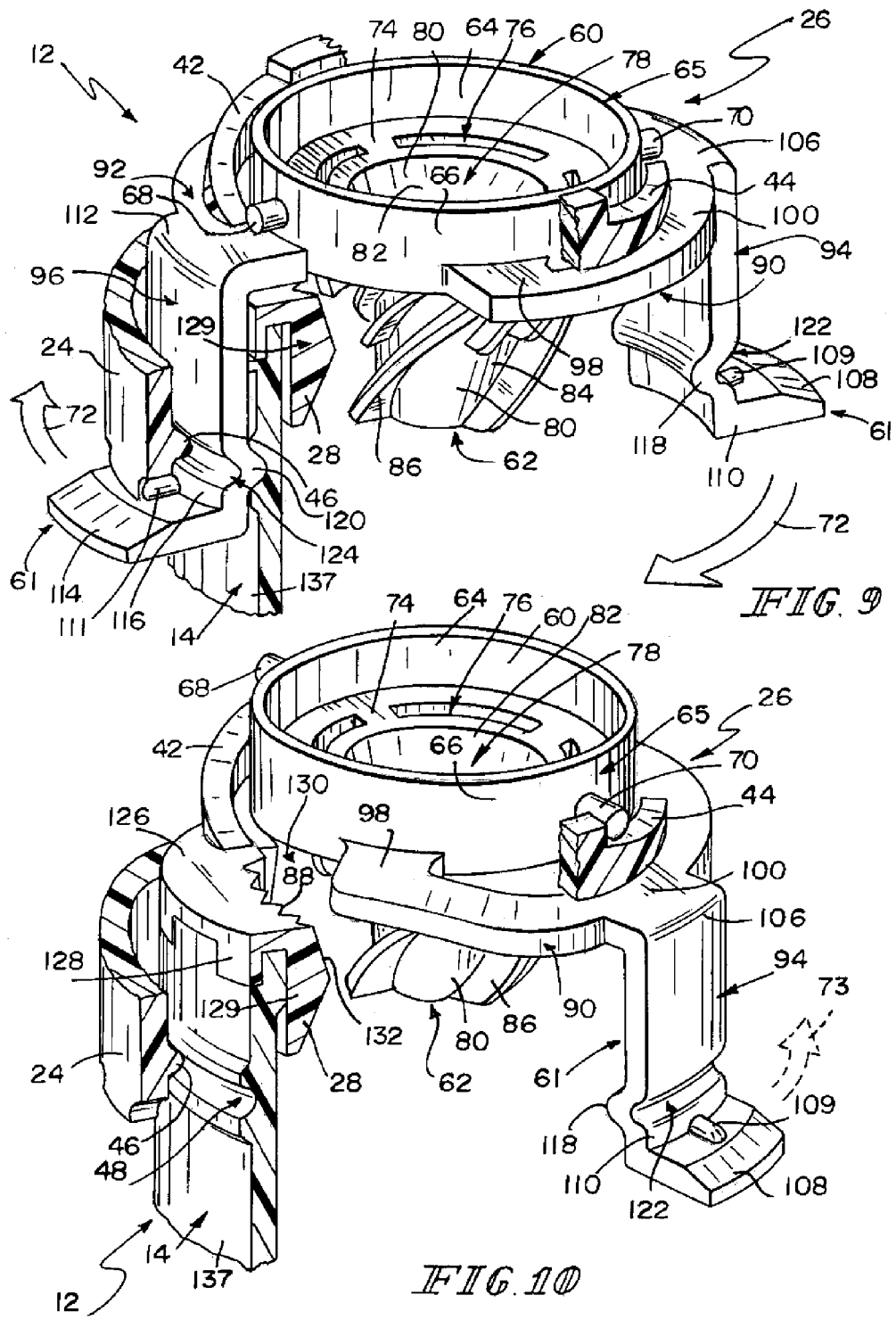

CANISTER WITH ADJUSTABLE GRINDER

This application claims priority under 25 U.S.C. §119(e) to U.S. Provisional Application Ser. No. 60/981,551, filed Oct. 22, 2007, which is expressly incorporated by reference herein.

BACKGROUND

The present disclosure relates to a canister, and particularly to a canister for containing spice kernels or other grindable media. More particularly, the present disclosure relates to a canister having a spice grinder for grinding the spice kernels.

SUMMARY

According to the present disclosure, a canister includes a container and a spice grinder coupled to the container. The spice grinder is provided to grind and dispense spice kernels stored within the container.

In illustrative embodiments, the spice grinder is adjustable and includes a grinding ring and a multi-position feed cone unit positioned within a shell. The grinding ring is coupled to the container to lie in a stationary position and is configured to include a series of exterior grinding teeth. The multi-position feed cone unit is mounted for movement relative to the stationary grinding ring among fine-grind, medium-grind, and coarse-grind positions. The multi-position feed cone unit includes an inverted feed cone having a series of helical flights arranged to provide interior grinding teeth and to confront the exterior grinding teeth of the grinding ring and a pair of coarseness-adjustment tabs that are used to reposition the inverted feed cone with respect to the grinding ring to change the size of a variable-size grinding chamber defined between the exterior and interior grinding teeth so as to change the coarseness of the grind.

Rotation of the coarseness-adjustment tabs in a clockwise direction relative to the shell causes the inverted feed cone to move away from the grinding ring to enlarge the size of the variable-size grinding chamber so as to produce coarser ground particles. Rotation of the coarseness-adjustment tabs in a counterclockwise direction relative to the shell causes the inverted feed cone to move toward the grinding ring to reduce the size of the variable-size grinding chamber so as to produce finer ground particles. Once a desired grinding setting is selected, rotation of the inverted container with respect to the spice grinder causes the spice kernels, moved by gravity from a storage region in the container into a variable-size grinding chamber provided between the grinding ring and the helical flights of the inverted feed cone, to be ground into fine, medium, or coarse particles in the grinding chamber.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a canister having an adjustable spice grinder coupled to the top of a container, showing the spice grinder having a shell and a coarseness-adjustment tab mounted for movement relative to the shell and positioned in one of several grind-size positions along the side wall of the shell and also showing a shell closure positioned on top of the shell to close a spice-dispensing outlet formed in the shell;

FIG. 2 is another perspective view of the spice grinder of FIG. 1 with the shell closure removed to expose the spice-dispensing outlet formed in the shell and showing a user gripping the shell with one hand and rotating the container with a second hand about an axis of rotation to cause spice kernels discharged from within the container to be ground by the spice grinder and released through a series of openings aligned with the spice-dispensing outlet formed in the shell;

FIG. 5 is a cross sectional view of the spice grinder taken along line 5-5 of FIG. 1 showing the inverted feed cone of the multi-position feed cone unit in the lowest of three positions with respect to the grinding ring upon mating engagement of the locator lug in a first of the three lug-receiving notches formed in the shell to provide for a fine grind of the spice kernels;

FIG. 6 is a cross sectional view similar to FIG. 5 showing the inverted feed cone of the multi-position feed cone unit in a middle position with respect to the grinding ring upon mating engagement of the locator lug in a second of the three lug-receiving notches formed in the shell;

FIG. 7 is a cross sectional view similar to FIGS. 5 and 6 showing the inverted feed cone of the multi-position feed cone unit in the highest position with respect to the grinding ring upon mating engagement of the lug in a third of the three lug-receiving notches formed in the shell to provide a coarse grind;

FIG. 9 is a partial perspective view of the spice grinder of FIG. 5 showing the inverted feed cone of the multi-position feed cone unit in the lowest position with respect to the grinding ring to produce a fine grind of the spice kernels and suggesting that the feed cone unit can be rotated in a clockwise direction to change the grind setting to produce a coarser grind by moving a guide pin included in the feed cone unit on a curved ramp included in the shell; and FIG. 10 is a partial perspective view of the spice grinder, similar to FIG. 9, showing the inverted feed cone of the multi-position feed cone unit in the highest position with respect to the grinding ring to produce a coarse grind of the spice kernels and suggesting that the feed cone unit can be rotated in a counterclockwise direction to change the grind setting to produce a finer grind by moving a guide pin included in the feed cone unit on a curved ramp included in the shell.

DETAILED DESCRIPTION

Figure 3:
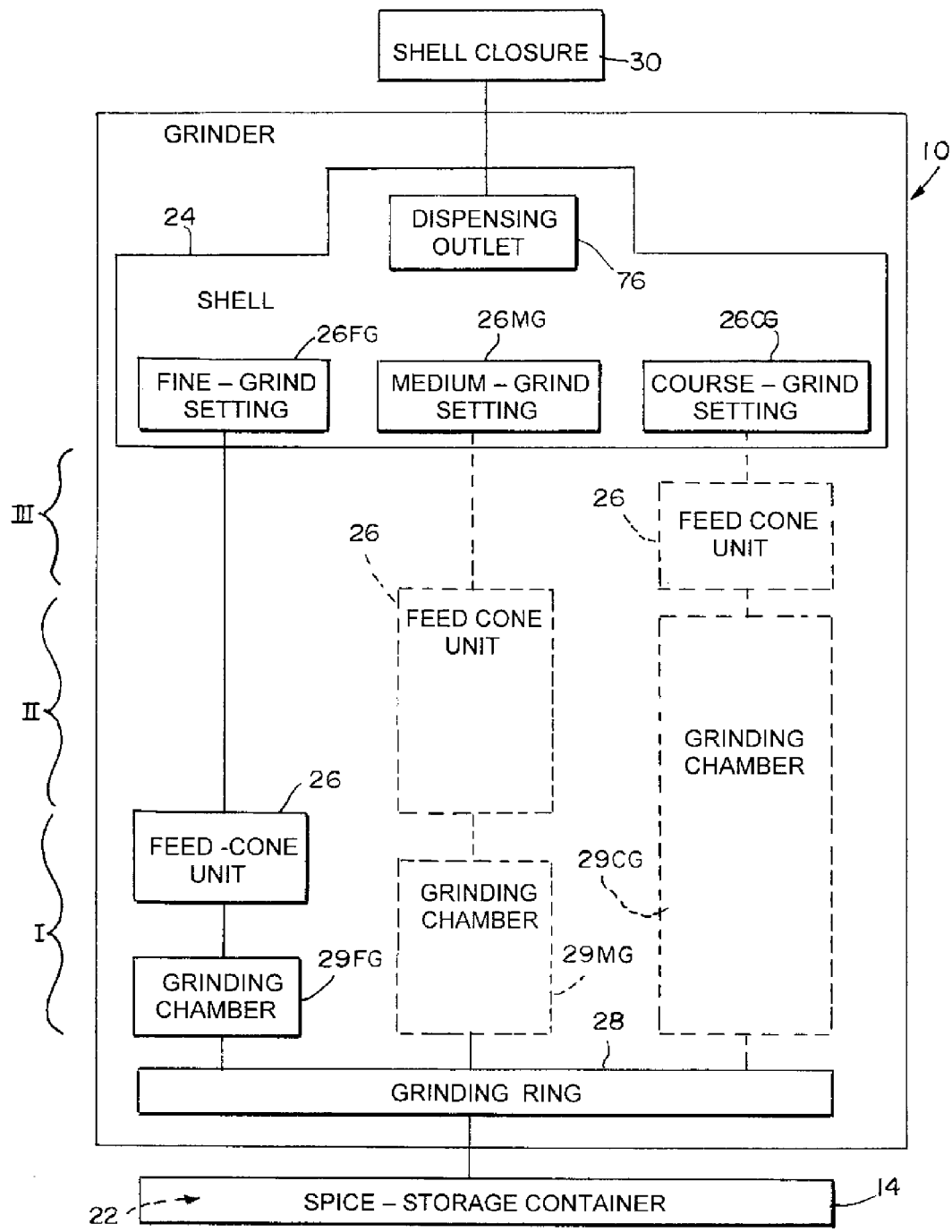
FIG. 3 is a diagrammatic view of a canister in accordance with the present disclosure showing the spice grinder coupled to the container and configured to include a multi-position feed cone unit mounted for movement relative to a stationary grinding ring coupled to a spice-storage container to vary the size of the variable-size grinding chamber so as to vary the coarseness of spices ground in the spice grinder and discharged through a dispensing outlet formed in the shell upon removal of the shell cover from the shell and showing that the feed cone unit is movable to mate with one of several grind settings associated with the shell to establish the position of the feed cone unit relative to the stationary grinding ring and thus the size of the variable-size grinding chamber.

A canister 12 is shown having an adjustable spice grinder 10 coupled to a container 14 in the illustrative embodiment of FIG. 1. Rotation of container 14 with respect to adjustable spice grinder 10 in clockwise direction 13 causes spice kernels, or other grindable media, positioned within container 14, to be ground into particles 203 and ejected from adjustable spice grinder 10, as shown, for example in FIG. 2. As suggested in FIG. 3, spice grinder 10 includes a grinding ring 28 coupled to container 14, a shell 24 coupled to container 14, and a multi-position feed cone unit 26 mounted for movement toward and away from grinding ring 28 to vary the size of a variable-size grinding chamber 29 formed between grinding ring 28 and multi-position feed cone unit 26 to as to vary the coarseness of the grind of media ground in grinding chamber 29 in response to rotation of multi-position feed cone unit 26 relative to stationary grinding ring 28. Multi-position feed cone unit 26 is mated to shell 24 in one of several positions to establish the size (e.g., volume) of variable-size grinding chamber 29 as shown diagrammatically in FIG. 3 and in cross-section in FIGS. 5-7.

As suggested in FIG. 3, multi-position feed cone unit 26 is movable relative to grinding ring 28 to change the size of grinding chamber 29 formed between feed cone unit 26 and grinding ring 28. Feed cone unit 26 is anchored to shell 24 in a first position (I) to establish a fine-grind setting 26FG and provide a small-sized grinding chamber 29FG as shown diagrammatically in solid in FIG. 3 and illustratively in FIG. 5. Feed cone unit 26 can be moved (at the option of a consumer) relative to grinding ring 28 to a second position (II) and anchored to shell 24 to establish a medium-grind setting 26MG and provide a relatively larger medium-sized grinding chamber 29MG as shown diagrammatically in phantom in FIG. 3 and illustratively in FIG. 6. Feed cone unit 26 can also be moved by a consumer relative to grinding ring 28 to a third position (III) and anchored to shell 29 to establish a coarse-grind setting 26CG and establish a relatively larger large-sized grinding chamber 29CG as shown diagrammatically in phantom in FIG. 3 and illustratively in FIG. 7.

In use, spice kernels 20 or other grindable media are stored in container 14 as suggested in FIGS. 4-7 and passed into one of grinding chambers 29FG, 29MG, or 29CG when container 14 is inverted as suggested in FIG. 2. A consumer grips shell 24 with one hand 101 so that shell 24 and feed cone unit 26 anchored to shell 24 (in one of the available grind settings, for example, 26FG, 26MG, or 26CG) are unable to rotate. Then the consumer grips container 14 with the other hand 102 and rotates container 14 and grinding ring 28 anchored to container 14 in direction 13 relative to shell 24 and feed cone unit 26 to cause any grindable media 20 present in the selected grinding chamber (29FG, 29MG, or 29CG) to be ground between grinding ring 28 and feed cone unit 26 and dispensed through a dispensing outlet 76 formed in shell 24 as either fine grind 201, medium grind 202, or course grind 203 as suggested in FIGS. 2 and 5-7. As suggested in FIG. 3, a shell closure 30 can be coupled to shell 24 to close dispensing outlet 76 if desired.

Spice-storage container 14 is formed to include an interior region 22 providing a product-receiving chamber containing spice kernels 20 or other grindable media as suggested in FIGS. 4-7. Container 14 also includes a neck 18 formed to include a mouth 19 opening into interior region 22 and sized to mate with grinding ring 28 as suggested in FIGS. 4 and 5-7. Container 14 also includes a barrel 137 and an external handgrip 139. Barrel 137 is formed to include interior region 22 and to terminate at neck 18. Handgrip 139 is coupled to barrel 137 and configured to be gripped easily by a consumer as suggested in FIG. 2 to facilitate rotation of container 14 (and grinding ring 28 coupled to neck 18 of container 14) about an axis of rotation 15 relative to shell 24 (and feed cone unit 26 coupled to shell 24).

Grinding ring 28 is coupled to neck 18 of container 14 as suggested in FIGS. 4 and 5-7 to communicate with and receive spice kernels 20 discharged from interior region 22 of container 14 through mouth 29 when container 14 is inverted. As suggested in FIG. 4, grinding ring 28 includes a container mount 127, an annular cone receiver 129 coupled to container mount 127 and formed to include a central opening and 130, and a series of exterior grinding teeth 88 coupled to cone receiver 129 and arranged to extend in radially inward directions to contact any spice kernels 20 that are discharged from container 12 into central opening 130.

Multi-position feed cone unit 26 is adjustable as suggested in FIGS. 4 and 5-7 as it can be moved up and down along axis 15 relative to grinding ring 28. Feed cone unit 26 is configured to be mated to shell 24 to retain feed cone unit 26 in a selected position relative to grinding ring 28 as suggested in FIGS. 5-7.

Feed cone unit 26 includes an inverted feed cone 62 arranged to extend into central opening 130 in grinding ring 28 to define grinding chamber 29 therebetween and a cone retainer 63 configured to provide means for moving inverted feed cone 62 in up and down directions along axis 15 to vary the size of grinding chamber 29 and for retaining inverted feed cone 62 in one of several selected positions along axis 15 relative to grinding ring 28. Illustratively, cone retainer 63 includes a cone support 60 coupled to inverted feed cone 62 and a feed-cone positioner 61 coupled to cone support 60. Feed-cone positioner 61 is configured to mate with shell 24 to provide means for retaining inverted feed cone 62 in one of several selected positions in central opening 130 of grinding ring 28, which positions correspond to first, second, and third positions (I, II, and III) of feed cone unit 26 and to fine-, medium-, and course-grind settings (26FG, 26MG, and 26CG) of feed cone unit 26. Movement of inverted feed cone 62 away from grinding ring 28 causes the size of variable-size grinding chamber 29 to increase, which increases the coarseness of the spice particles produced by the interaction of the inverted feed cone 62 and grinding ring 28.

In illustrative embodiments, feed-cone positioner 61 includes first and second position controllers 121, 122. First position controller 121 includes a first spring member 90 coupled to rim 65 of cone support 60, a downwardly extending first adjustment arm 94 coupled to first spring member 90, a radially outwardly extending first coarseness-adjustment tab 108 coupled to first adjustment arm 94, and a locator lug 109 sized to fit into any one of several companion lug-receiving notches 58f, 58m, and 58c formed in shell 24 and arranged to correspond to fine-, medium-, and coarse-grind settings 26FG, 26MG, and 26CG. Second position controller 122 includes a second spring member 92 coupled to cone support 60, a downwardly extending second adjustment arm 96 coupled to second spring member 92, a radially outwardly extending second coarseness-adjustment tab 114 coupled to second adjustment arm 96, and a locator lug 111 sized to fit into any one of several companion lug-receiving notches 58*f*, 58*m*, and 58*c* formed in shell 24.

Figure 8:
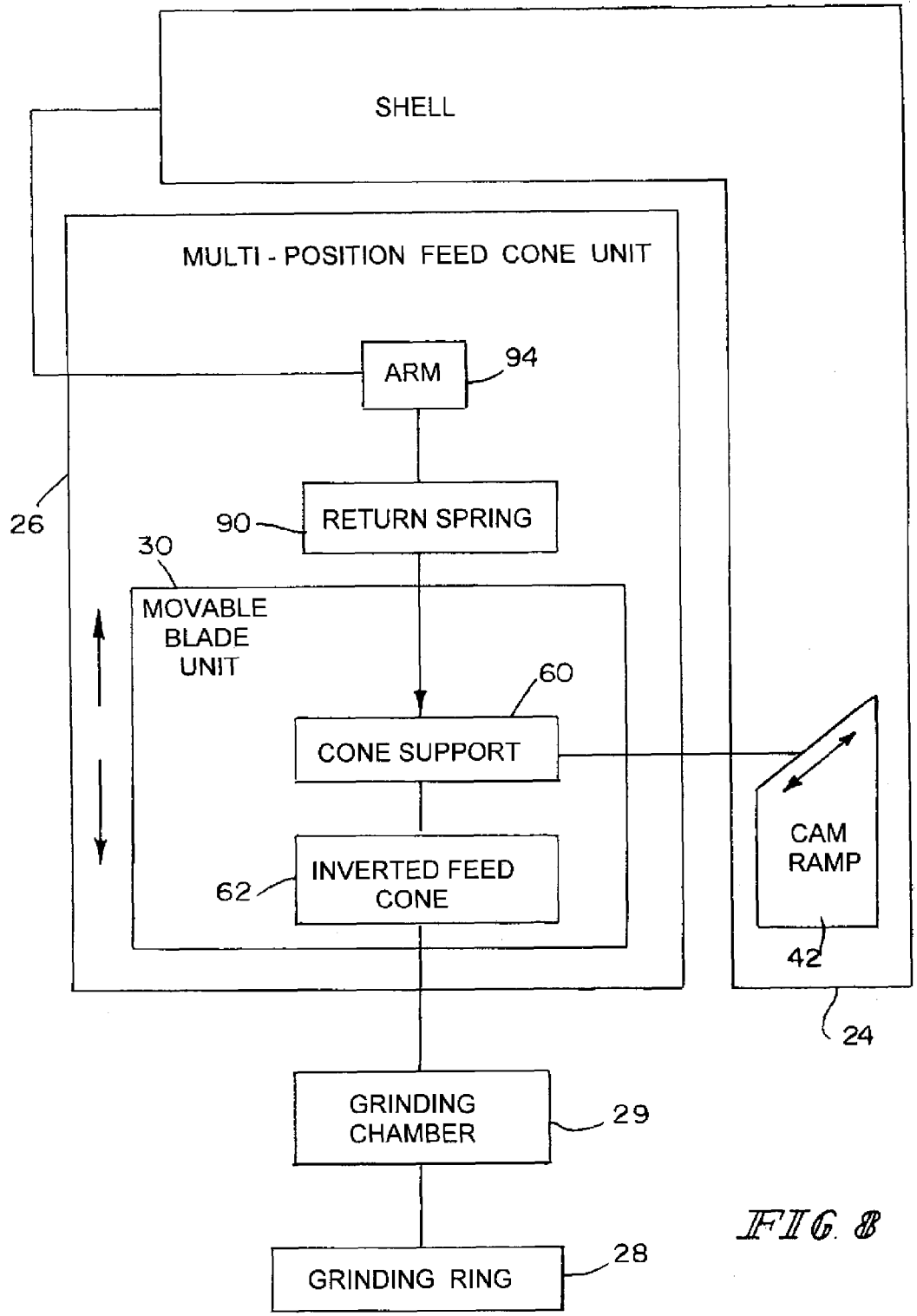
FIG. 8 is a diagrammatic view of the grinder in accordance with the present disclosure showing a movable blade unit comprising an inverted feed cone and cone support, the cone support includes a rim coupled to the inverted feed cone and a radially outwardly extending guide pin that is coupled to the rim and arranged to ride on a cam ramp included in the shell during rotation of the feed cone unit about an axis of rotation to change the position of the inverted feed cone relative to the underlying grinder ring so as to vary the size of the variable-size grind chamber and change the size of the ground particle produced in the grinder chamber, and also showing a return spring that yieldly urges the movable blade unit toward the grinder ring.

Multi-position feed cone unit 26 and grinding ring 28 are configured to be positioned within shell 24 of adjustable spice grinder 10, as shown, for example in FIG. 8. Multi-position feed cone unit 26 is preferably one piece and includes a movable blade unit 33. Movable blade unit 33 includes a cone support 60 and an inverted feed cone 62.

Cone support 60 is coupled to inverted feed cone 62, as shown, for example, in FIG. 9. Cone support 60 includes a rim 65 having an inside surface 64 and an outside surface 66. Multi-position feed cone unit 26 also includes first and second outwardly extending guide pins 68, 70 that are coupled to outside surface 66 of cone support 60 as suggested in FIG. 4 and configured to engage and slide along first and second ramps 42, 44 included in shell 24 as suggested in FIG. 4 during movement of inverted feed cone 62 and cone support 60 with respect to shell 24 in clockwise direction 72 as suggested in FIG. 9.

Cone support 60 of multi-position feed cone unit 26 is coupled to top wall 74, as shown, for example, in FIGS. 9 and 10. Top wall 74 is formed to include a series of slots 76 that are adapted to allow contents 20 of container 14, that have been ground into particles, by relative motion of feed cone unit 26 and grinding ring 28, to exit adjustable spice grinder 10. Inverted feed cone 62 also includes a tapered cone body 80 that extends downwardly from top wall 74.

Tapered cone body 80 of inverted feed cone 62 includes an inside surface 82 and an outside surface 84, as shown, for example, in FIG. 9. Outside surface 84 includes a series of interior grinding teeth provided for example, by helical flights 86 that extend radially outwardly from outside surface 84 of tapered cone body 80 of inverted feed cone 62. Helical flights 86 are positioned to lie near exterior grinding teeth 88. Helical flights 86 are adapted to cooperate with exterior grinding teeth 88 to grind contents 20 of container 14 when inverted feed cone 62 is rotated with respect to grinding ring 28. The closer helical flights 86 are positioned near exterior grinding teeth 88 of grinding ring 28, the finer contents 20 of container 14 are ground. The coarseness of the grind is controlled by changing the axial position of inverted feed cone 62 with respect to grinding ring 28.

Spring members 90, 92 and coarseness-adjustment arms 94, 96 cooperate to provide means for repositioning inverted feed cone 62 with respect to grinding ring 28, as shown, for example, in FIGS. 9 and 10. Spring member 90 is coupled to cone support 60 at a first end 98 and coupled to adjustment arm 94 at a second end 100. Similarly, spring member 92 is coupled to cone support 60 at a first end 102, on the opposite side of cone support 60, and to adjustment arm 96 at a second end 104.

Spring members 90, 92 are flexible and made of an elastic material to bias cone support 60 and inverted feed cone 62 downwardly as first and second guide pins 68, 70 slide along ramps 42, 44 of shell 24 during counterclockwise rotation 72 of feed cone unit 26 with respect to shell 24, as shown, for example, in FIG. 9. Spring members 90, 92 are in a relaxed position when guide pins 68, 70 are at the base of ramps 42, 44, as shown, for example, in FIG. 9, and are flexed and under load when guide pins 68, 70 are at the top of ramps 42, 44, as shown, for example, in FIG. 10. The biasing force of spring members 90, 92 causes guide pins 68, 70 to maintain contact with ramps 42, 44 during grinding.

Coarseness-adjustment arm 94 is coupled to spring member 90 at a first end 106 and to coarseness-adjustment tab 108 at a second end 110, as shown, for example, in FIGS. 9 and 10. In a similar fashion, coarseness-adjustment arm 96 is coupled to spring member 92 at a first end 112 and to coarseness-adjustment tab 114 at a second end 116. Coarseness-adjustment arms 94, 96 are positioned inside of side wall 34 of shell 24 and extend vertically from spring members 90, 92 to coarseness-adjustment tabs 108, 114. Coarseness-adjustment arms 94, 96 also include inwardly extending ribs 118, 120 that are positioned to lie within groove 48 of container 14 to allow coarseness-adjustment arms 94, 96 to rotate with respect to container 14.

Coarseness-adjustment tabs 108, 114 each carry a locator lug 109, 111, as shown, for example, in FIGS. 9 and 10. Locator lugs 109, 111 are adapted to engage lug-receiving notches 58 of shell 24 to lock in coarseness-adjustment tabs 108, 114 in one of several positions (I, II, or III) to retain the position of cone support 60 and inverted feed cone 62 with respect to grinding ring 28. Moving coarseness-adjustment tabs 108, 114 and locator lugs 109, 111 between lug-receiving notches 58 changes the coarseness of the grind by causing inverted feed cone 62 to move closer or farther from grinding ring 28 along axis 15.

Rotation of coarseness-adjustment tabs 108, 114 in clockwise direction 72 causes guide pins 68, 70 of multi-position feed cone unit 26 to cam up ramps 42, 44 of shell 24 to space inverted feed cone 62 from grinding ring 28, as shown diagrammatically in FIG. 8 and in partial perspective in FIG. 9. Rotation of coarseness-adjustment tabs 108, 114 in counterclockwise direction 73 causes guide pins 68, 70 of multi-position feed cone unit 26 to cam down ramps 42, 44 of shell 24 to decrease the space between inverted feed cone 62 and grinding ring 28 and thereby reduce the size of the variable-size grinding chamber, as shown, for example, in FIG. 10.

Coarseness-adjustment arms 94, 96 are also formed to include grooves 122, 124, as shown, for example, in FIG. 9. Lip 46 of shell 24 is positioned to lie in grooves 122, 124, as shown, for example, in FIG. 9. This arrangement allows coarseness-adjustment arms 94, 96 to rotate with respect to shell 24 to permit adjustment to the position of multi-position feed cone unit 26 relative to grinding ring 28. Similarly, ribs 118, 120 are positioned to lie within groove 48 of container 14 to allow container 14 to rotate with respect to both multi-position feed cone unit 26 and shell 24.

Figure 4:
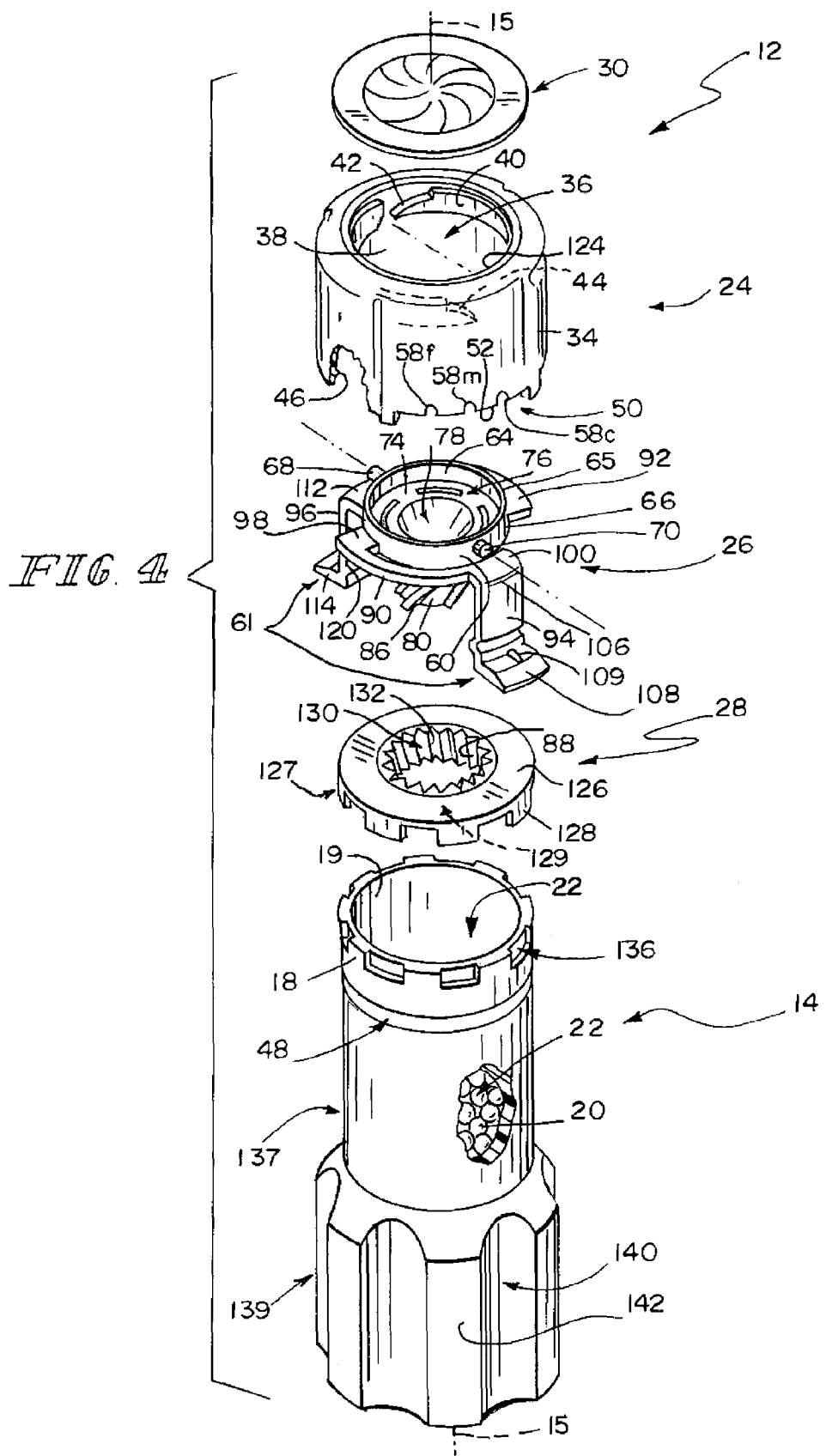
FIG. 4 is an exploded perspective view of the canister of FIG. 1 showing, from the bottom to the top of the page, the container, the grinding ring, the multi-position feed cone unit, the shell, and the shell closure and showing that the shell is formed to include three spaced-apart downwardly opening lug-receiving notches and the feed cone unit includes a coarseness-adjustment tab carrying a locator sized to fit into one of the lug-receiving notches formed in the shell to establish the grind setting of the grinder.

Grinding ring 28 is coupled to container 14 and multi-position feed cone unit 26 is positioned to lie near grinding ring 28, as shown diagrammatically in FIG. 3 and in perspective in FIGS. 4, 8, and 9. Shell 24 of adjustable spice grinder 10 houses multi-position feed cone unit 26 and grinding ring 28 and includes a top wall 32 and an annular side wall 34 that depends from top wall 32, as shown, for example, in FIG. 4. Top wall 32 and side wall 34 are formed to include a chamber 36 that is adapted to accept multi-position feed cone unit 26. Shell 24 also includes an inner wall 38 having an annular band 40. Annular band 40 of shell 24 includes a pair of ramps 42, 44 used in the adjustment of multi-position feed cone unit 26.

Side wall 34 of shell 24 also includes a recess 50, as shown, for example, in FIG. 4. Recess 50 is defined by upper edge 52 and side edges 54, 56. Upper edge 52 of side wall 34 includes a series of lug-receiving notches 58 that provide adjustment positions to allow for incremental adjustment of multi-position feed cone unit 26. Side edges 54, 46 limit rotational movement of multi-position feed cone unit 26 to provide for minimum and maximum ranges for grinding.

Grinding ring 28 is adapted to be coupled to container 14 and is positioned to lie near inverted feed cone 62 of multi-position feed cone unit 26, as shown, for example, in FIGS. 4 and 9. Grinding ring 28 includes a top wall 126 included in cone receiver 129 and a series of flanges 128 that are included in container mount 127 and arranged to depend from top wall 126. Flanges 128 are adapted to engage notches 136 formed in neck 18 of container 14 to interlock container 14 and grinding ring 28 so that rotation of container 14 about axis 15 causes rotation of grinding ring 28.

Grinding ring 28 also includes an opening 130 formed in top wall 126. Opening 130 is defined by inner wall 132, as shown, for example, in FIG. 4. Inner wall 132 includes exterior grinding teeth 88 that are adapted to cooperate with helical flights 86 of inverted feed cone 62 to grind contents 20 of container 14 when grinding ring 28 is rotated with respect to inverted feed cone 62.

Adjustable spice grinder 10 is arranged to be coupled to container 14, as shown, for example, in FIG. 1. In illustrative embodiments, container 14 includes an upwardly opening basin 16 and a neck 18, as shown, for example, in FIG. 4. Neck 18 of container 14 is adapted to accept adjustable spice grinder 10 to seal in contents 20 of container 14.

Contents 20, by way of example and not limitation, may be in the form of spice kernels, such as peppercorns, granules of salt, or other media that are ground by grinders. Basin 16 of container 14 is formed to include a product-receiving chamber 22. Product-receiving chamber 22 is adapted to contain contents 20 and is sealed when adjustable spice grinder 10 is coupled to neck 18 of container 14.

Container 14 includes an annular side wall 138 that includes a series of alternating grooves 140 and ribs 142 that create a gripping surface of handgrip 139 to assist in rotating container 14 with respect to shell 24, as shown, for example, in FIGS. 1 and 4. The gripping surface allows a user to grasp container 14 to apply torque to grind contents 20 of container 14 between exterior grinding teeth 88 of grinding ring 28 and interior helical flights 86 of inverted feed cone 62.

Adjustable spice grinder 10 also includes a shell closure 30 that is coupled to shell 24 to prevent the release of spice through a dispensing outlet 124 formed in shell and exposed to chamber 36 when adjustable spice grinder 10 is not in use. Shell 24 is adapted to be gripped in one hand while container 14 is rotated to cause grinding ring 28 to rotate with respect to multi-position feed cone unit 26.

Movement of inverted feed cone 62 by rotation of coarseness-adjustment tabs 108, 114 is shown in the illustrative embodiments of FIGS. 5-7. Rotating coarseness-adjustment tabs 108, 114 counterclockwise to the first 58*f* of the three lug-receiving notches 58*f*, 58*m*, 58*c* places interior helical flights 86 closest to exterior grinding teeth 88 of grinding ring 28 to produce the finest grind, as shown, for example, in FIG. 5. In this position, guide pins 68, 70 are in their lowest position on ramps 42, 44 and spring members 90, 92 are relaxed and not under tension.

Rotating coarseness-adjustment tabs 108, 114 clockwise to the second 58*m* of the three lug-receiving notches 58 places helical flights 86 further away from exterior grinding teeth 88 of grinding ring 28 to produce a medium-level grind, as shown, for example, in FIG. 6. In this position, guide pins 68, 70 are approximately at the mid-point of ramps 42, 44 and spring members 90, 92 are under slight tension. The resultant spice is coarser than when coarseness-adjustment tabs 108, 114 are in the first 58*f* of the three lug-receiving notches 58.

Rotating coarseness-adjustment tabs 108, 114 clockwise to the third 58*c* of the three lug-receiving notches 58 places helical flights 86 the furthest from exterior grinding teeth 88 of grinding ring 28 to produce a coarse grind, as shown, for example, in FIG. 7. In this position, guide pins 68, 70 are at the top of ramps 42, 44 and spring members 90, 92 are under strong tension. The resultant spice particles are coarser than when coarseness-adjustment tabs 108, 114 are in the first 58*f* or second 58*m* of the three lug-receiving notches 58.

In use, shell closure 30 is removed from shell 24 to expose slots 76 formed in top wall 74 of adjustable feed cone unit 26, as shown, for example, in FIG. 2. Once shell closure 30 is removed, the user depresses coarseness-adjustment tabs 108, 114 to release locator lugs 109, 111 from lug-receiving notches 58 of shell 24 to select the coarseness of the grind. Once locator lugs 109, 111 are cleared from lug-receiving notches 58, coarseness-adjustment tabs 108, 114 can be rotated to one of the other available lug-receiving notches 58 to cause inverted feed cone 62 to move with respect to grinding ring 28 to adjust the coarseness of the grind.

Movement of coarseness-adjustment tabs 108, 114 to another notch 58 causes coarseness-adjustment arms 94, 96, spring members 90, 92, cone support 60, and inverted feed cone 62 to rotate. Rotation of cone support 60 in clockwise direction 72 causes guide pins 68, 70 of cone support 60 to slide upwardly along ramps 42, 44 of shell 24 to space inverted feed cone 62 away from grinding ring 28 to cause a coarser grind of contents 20 of container 14.

Once the desired position is selected, locator lugs 109, 111 are released to lock locator lugs 109, 111 into one of the lug-receiving notches 58*f*, 58*m*, 58*c* to secure the position of coarseness-adjustment tabs 108, 114, which maintains the position of inverted feed cone 62 with respect to grinding ring 28. With coarseness-adjustment tabs 108, 114 locked into position, the user can rotate container 14 with respect to shell 24. Rotation of container 14 with respect to shell 24 causes rotation of grinding ring 28 with respect to inverted feed cone 62. Spice kernels caught between interior grinding teeth defined by helical flights 86 of inverted feed cone 62 and exterior grinding teeth 88 of grinding ring 28 are ground into particles. Ground spice particles exit through slots 76 of top wall 74. Once the desired amount of ground spice has been displaced, the user replaces shell closure 30 on shell 24.

The invention claimed is:

1. An adjustable spice grinder for a spice container configured to contain a grindable media, the grinder comprising a grinding ring adapted to be coupled to a container formed to include a produce-receiving chamber, the grinding ring being formed to include a central opening exposed to grindable media extant in the product-receiving chamber, the grinding ring including a series of exterior grinding teeth arranged to extend around the central opening and to contact any grindable media that are discharged from the product-receiving chamber into the central opening, a shell associated with the grinding ring and formed to include a dispensing outlet arranged to communicate with the central opening formed in the grinding ring, the shell being formed to include at least two grind-coarseness notches, each grind-coarseness notch being associated with a selected grind-coarseness criterion, a multi-position feed cone unit including a feed cone arranged to extend into the central opening and formed to include interior grinding teeth arranged to confront and extend toward surrounding exterior grinding teeth included in the grinding ring to define a grinding chamber located therebetween and in communication with each of the dispensing outlet formed in the shell and a product-receiving chamber formed in a container coupled to the grinding ring, the multi-position feed cone unit further including a cone retainer configured to provide means for moving the feed cone in up-and-down directions in the central opening formed in the grinding ring to vary spacing between the exterior and interior grinding teeth and the size of the grinding chamber and thus vary the coarseness of grindable media ground between the exterior and interior grinding teeth and for mating with one of the grind-coarseness notches formed in the shell to retain the feed cone in a selected vertical position relative to the grinding ring to set the spacing between the exterior and interior grinding teeth and establish a selected size of the grinding chamber to determine coarseness of any grindable media ground in the grinding chamber, wherein the cone retainer includes a cone support coupled to the feed cone and arranged to overlie the grinding ring and support the feed one for up-and-down movement in the central opening formed in the grinding ring and a feed-cone positioner coupled to the feed cone for movement therewith relative to the grinding ring and configured to include a locator lug arranged to mate with one of the grind-coarseness notches formed in the shell to establish the selected vertical position of the feed cone relative to the grinding ring, and wherein the cone support includes a guide pin and the shell includes a ramp arranged to engage the guide pin and provide means for moving the guide pin away from the grinding ring to move the interior grinding teeth of the feed cone unit relative to the exterior grinding teeth of the grind ring to vary the spacing between the exterior and interior grinding teeth and the size of the grinding chamber.

2. The grinder of claim 1, wherein the ramp has an inclined helical shape and is arranged to lie between the guide pin and the grinding ring.

3. The grinder of claim 1, wherein the shell includes a top wall formed to include the dispensing outlet and a side wall appended to a perimeter edge of the top wall and arranged to extend in a downward direction to surround the grinding ring and the ramp is appended to an interior surface of the side wall of the shell.

4. The grinder of claim 1, wherein the cone support includes an annular rim arranged to overlie the grinding ring and the feed cone, the guide pin is coupled to the annular rim and arranged to extend in a radially outward direction from the rim to mate with the ramp included in the shell, and the feed-cone positioner is coupled to the annular rim of the cone support to move therewith relative to the grinding ring.

5. The grinder of claim 4, wherein the feed-cone positioner includes a position controller coupled to the rim and arranged to extend through a space provided between the shell and the grinding ring and terminate at a coarseness-adjustment tab located outside of the shell and coupled to the locator lug.

6. The grinder of claim 5, wherein the position controller includes a spring member made of an elastic material and coupled to the cone support and a downwardly extending adjustment arm arranged to interconnect the spring member and the coarseness-adjustment tab and to lie between the interior grinding teeth of the feed cone unit and a side wall of the shell located to surround the grinding ring and formed to include the grind-coarseness notches.

7. An adjustable spice grinder for a spice container configured to contain a grindable media, the grinder comprising a grinding ring adapted to be coupled to a container formed to include a produce-receiving chamber, the grinding ring being formed to include a central opening exposed to grindable media extant in the product-receiving chamber, the grinding ring including a series of exterior grinding teeth arranged to extend around the central opening and to contact any grindable media that are discharged from the product-receiving chamber into the central opening, a shell associated with the grinding ring and formed to include a dispensing outlet arranged to communicate with the central opening formed in the grinding ring, the shell being formed to include at least two grind-coarseness notches, each grind-coarseness notch being associated with a selected grind-coarseness criterion, a multi-position feed cone unit including a feed cone arranged to extend into the central opening and formed to include interior grinding teeth arranged to confront and extend toward surrounding exterior grinding teeth included in the grinding ring to define a grinding chamber located therebetween and in communication with each of the dispensing outlet formed in the shell and a product-receiving chamber formed in a container coupled to the grinding ring, the multi-position feed cone unit further including a cone retainer configured to provide means for moving the feed cone in up-and-down directions in the central opening formed in the grinding ring to vary spacing between the exterior and interior grinding teeth and the size of the grinding chamber and thus vary the coarseness of grindable media ground between the exterior and interior grinding teeth and for mating with one of the grind-coarseness notches formed in the shell to retain the feed cone in a selected vertical position relative to the grinding ring to set the spacing between the exterior and interior grinding teeth and establish a selected size of the grinding chamber to determine coarseness of any grindable media ground in the grinding chamber, wherein the cone retainer includes a cone support coupled to the feed cone and arranged to overlie the grinding ring and support the feed cone for up-and-down movement in the central opening formed in the grinding ring and a feed-cone positioner coupled to the feed cone for movement therewith relative to the grinding ring and configured to include a locator lug arranged to mate with one of the grind-coarseness notches formed in the shell to establish the selected vertical position of the feed cone relative to the grinding ring, and wherein the feed-cone positioner includes a position controller coupled to the feed cone and to the locator lug and the position controller includes a spring arm coupled to the feed cone, a coarseness-adjustment tab coupled to the locator lug, and a coarseness-adjustment arm arranged to interconnect the spring arm and the coarseness-adjustment tab.

8. The grinder of claim 7, wherein the spring member and the coarseness-adjustment arm cooperate to provide means for repositioning the feed cone with respect to the grinding ring.

9. The grinder of claim 8, wherein the spring member is flexible and made of an elastic material to bias the cone support in a downward direction toward the grinding ring as the guide pin slides along the ramp from a low-elevation base end of the ramp to a relatively higher high-elevation top end of the ramp during counter-clockwise rotation of the feed cone unit relative to the shell to cause the spring member to be in a relaxed position when the guide pin is located at the base end of the ramp and is fixed and under load when the guide pin is at the top end of the ramp so as to cause the guide pin to maintain contact with the ramp during grinding of a grindable material in the grinding chamber.

10. The grinder of claim 8, wherein the coarseness-adjustment arm includes an upper end coupled to the spring member and a lower end coupled to the coarseness-adjustment tab and the coarseness-adjustment arm is arranged to extend substantially vertically from the spring member to the coarseness-adjustment tab and lie in a space provided between the shell and the grinding ring.

11. An adjustable spice grinder for a spice container containing a grindable media, grinder comprising
a grinding ring adapted to be coupled to the spice container, the grinding ring having a series of exterior grinding teeth,
a multi-position feed cone unit mounted for movement relative to the grinding ring among fine-grind, medium-grind, and coarse-grind positions, the multi-position feed cone unit including a cone support and an inverted feed cone having a series of flights that cooperate with the exterior grinding teeth to form a variable-size grinding chamber therebetween and grind the media of the spice container in the variable-size grinding chamber,
adjustment means for adjusting the position of the inverted feed cone with respect to the grinding ring to vary the size of the variable-size grinding chamber to allow for selective variation in the coarseness of the media round between the grinding ring and the inverted feed cone, and
wherein the multi-position feed cone unit includes a spring member and a coarseness-adjustment arm that cooperate to provide means for repositioning inverted feed cone with respect to grinding ring cooperate to and further comprising a shell having a ramped surface arranged to mate with a guide pin included in the cone support.

12. The grinder of claim 11, wherein the spring member is coupled to the cone support at a first end and coupled to the coarseness-adjustment arm at a second end.

13. The grinder of claim 11, wherein the spring member is flexible and configured to bias the cone support and inverted feed cone toward the grinding ring.

14. The grinder of claim 13, wherein the multi-position feed cone unit includes a guide pin that slides along the ramped surface of the shell during clockwise and counter-clockwise rotation of the multi-position feed cone unit with respect to the shell.

15. The grinder of claim 11, further comprising a shell having a ramped surface arranged to mate with a guide pin included in the multi-position feed cone unit.

16. The grinder of claim 15, wherein the adjustment means includes a pair of coarseness-adjustment tabs that cooperate to reposition the inverted feed cone with respect to the grinding ring to change the coarseness of the grind.

17. The grinder of claim 16, wherein rotation of the coarseness-adjustment tabs in a first direction relative to the shell causes the inverted feed cone to move toward the grinding ring to reduce the size of the variable-size grinding chamber produce finer ground particles and rotation of the coarseness-adjustment tabs in a second direction relative to the shell causes the inverted feed cone to move away from the grinding ring to enlarge the size of the variable-size grinding chamber to produce coarser ground particles.

18. The grinder of claim 16, wherein the shell is formed to include recesses configured to accept the coarseness-adjustment tabs and the recesses have a top edge formed to include lug-receiver notches.

19. The grinder of claim 18, wherein the coarseness-adjustment tabs each include a locator lug that is configured to selectively engage the lug-receiver notches for fine-grind, medium-grind, and coarse-grind positions.

20. The grinder of claim 18, wherein the cone support includes a guide pin that engages and slides along the ramped surface of the shell to reposition the inverted feed cone with respect to the grinding ring.

21. The grinder of claim 11, wherein the grinding ring includes a top wall formed to include an opening, the opening defined by a side wall including the grinding teeth.

22. The grinder of claim 21, wherein the grinding ring includes a flange that is adapted to engage the spice container so that rotation of the spice container causes rotation of the grinding ring.

23. A grinder for a spice container containing a grindable media comprising
a shell adapted to be coupled to the spice container,
a grinding ring positioned within the shell and adapted to be rotated by the spice container, the grinding ring having a series of exterior grinding teeth,
a feed cone positioned within the shell ter movement relative to the grinding ring among multiple grinding positions, the feed cone having a series of helical flights that cooperate with the exterior grinding teeth to define a variable-size grinding chamber therebetween and to grind the media of the spice, container in the variable-size grinding chamber, and
a coarseness-adjustment tab configured to move with respect to the shell to cause the repositioning of the feed cone with respect to the grinding ring to vary the size of the variable-size grinding chamber and to permit selective variation in the coarseness of the media ground by the grinding ring and the feed cone,
wherein the shell includes an inner wall having first and second ramps, and
further comprising a cone support that is coupled to the feed cone and wherein the cone support includes guide pins that engage and slide along the first and second ramps of the shell to reposition the feed cone with respect to the grinding ring.

24. The grinder of claim 23, wherein the shell includes a side wall formed to include a recess configured to accept the coarseness-adjustment tab.

25. An grinder for a spice container containing a grindable media comprising
a shell adapted to be coupled to the spice container,
a grinding ring positioned within the shell and adapted to be rotated by the spice container, the grinding ring having a series of exterior grinding teeth,
a feed cone positioned within the shell for movement relative to the grinding ring among multiple grinding positions, the feed cone having a series of helical flights that cooperate with the exterior grinding teeth to define a variable-size grinding chamber therebetween and to grind the media of the spice container in the variable-size grinding chamber, and
a coarseness-adjustment tab configured to move with respect to the shell to cause the repositioning of the feed cone with respect to the grinding ring to vary the size of the variable-size grinding chamber and to permit selective variation in the coarseness of the media ground by the grinding ring and the feed cone,
wherein the shell includes an inner wall having first and second ramps,
wherein the shell includes a side wall formed to include a recess configured to accept the coarseness-adjustment tab, and
wherein the recess includes an edge formed to include a series of lug-receiver notches and the coarseness-adjustment tab carries a locator lug configured to be positioned within the lug-receiver notches to provide multiple adjustment positions to allow for incremental adjustment of the feed cone with respect to the grinding ring.

26. The adjustable spice grinder of claim 25, wherein the grinding ring is formed to include an opening that is defined by an inner wall.

27. The adjustable spice grinder of claim 26, wherein the grinding ring includes a flange that is adapted to engage the spice container to interlock the spice container and the grinding ring so that rotation of the spice container causes rotation of the grinding ring.

* * * * *